Sept. 15, 1942.  R. H. SMITH  2,295,761
POULTRY PICKING APPARATUS
Filed April 26, 1941  2 Sheets-Sheet 1
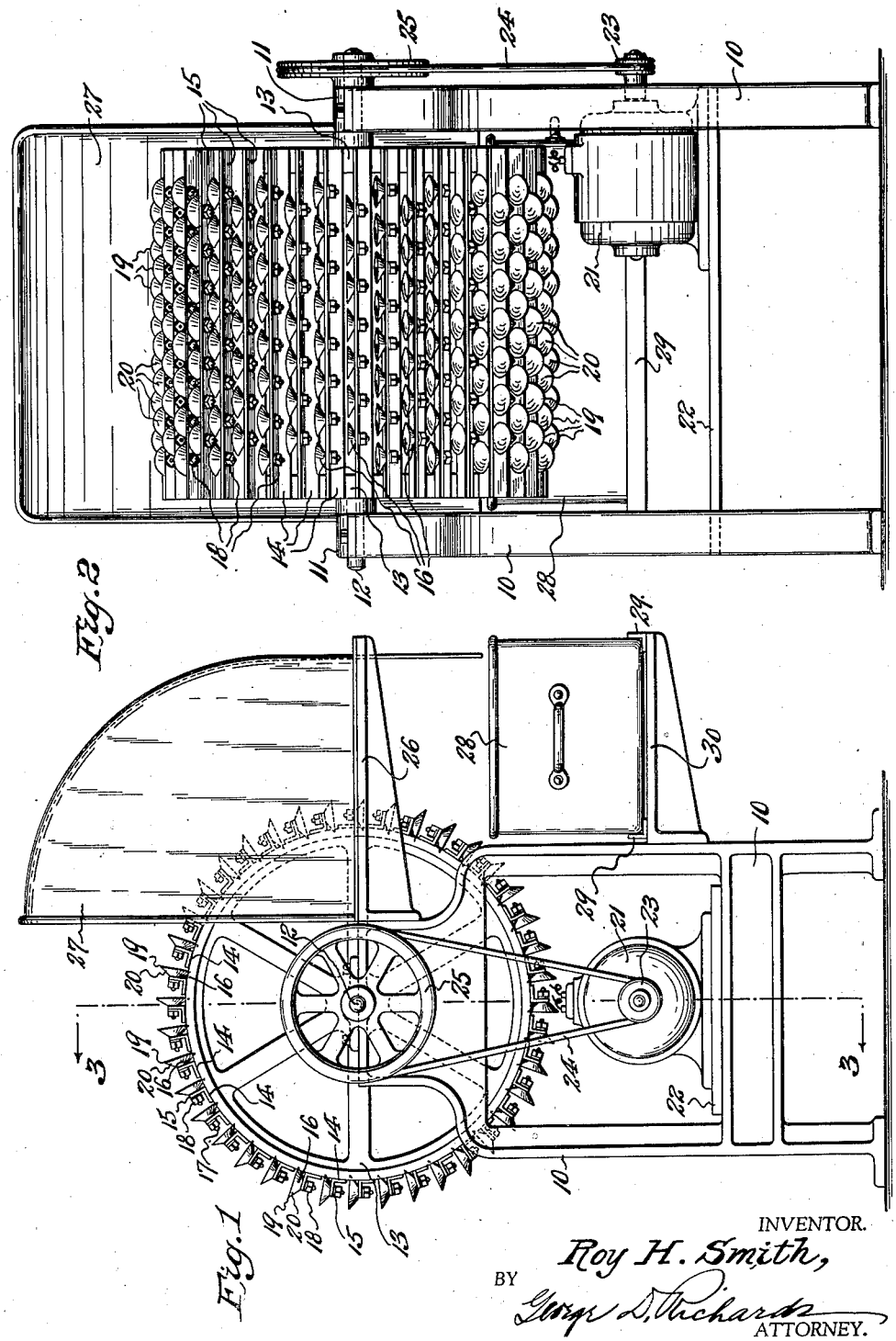
INVENTOR.
Roy H. Smith,
BY George D. Richards
ATTORNEY.

Sept. 15, 1942.  R. H. SMITH  2,295,761
POULTRY PICKING APPARATUS
Filed April 26, 1941  2 Sheets-Sheet 2
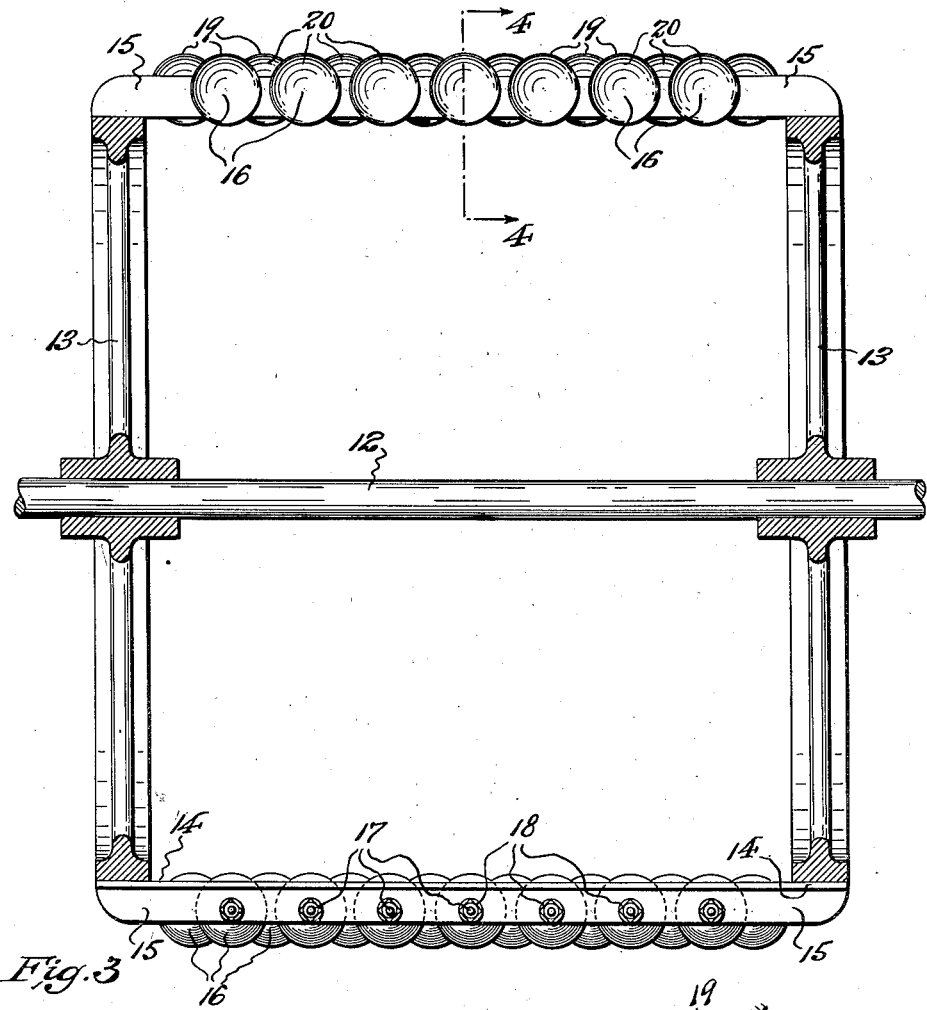
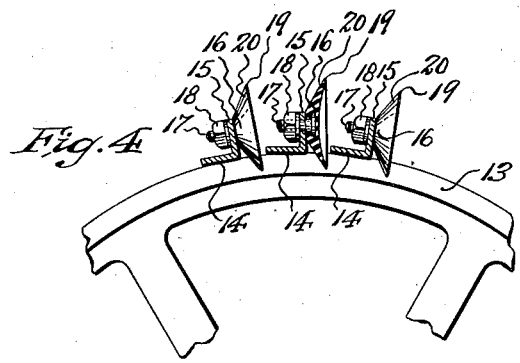
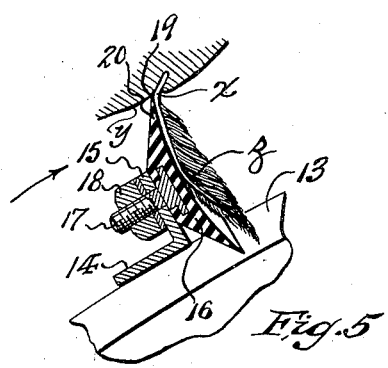
INVENTOR.
Roy H. Smith,
BY George D. Richards
ATTORNEY.

Patented Sept. 15, 1942

2,295,761

UNITED STATES PATENT OFFICE 2,295,761

POULTRY PICKING APPARATUS

Roy H. Smith, Chatham Township, Morris County, N. J.

Application April 26, 1941, Serial No. 390,552

10 Claims. (Cl. 17—11.1)

This invention relates to apparatus for dressing poultry; and the invention has reference, more particularly, to improved means for removing the feathers from poultry in the process of dressing the same for the market.

This invention has for an object to provide a simple and yet highly efficient apparatus for rapidly removing the feathers from fowls; said apparatus being of such novel construction and operating in such novel manner as to quickly and cleanly pick or pluck away the feathers from the skin of the fowl without risk of lacerating the skin or bruising the flesh, thus assuring that the fowl is presented for sale in a clean and unblemished condition.

This invention has for a further object to provide a novel feather picking apparatus comprising, a cylindrical rotary picker drum having an operative surface provided by a multiplicity of spaced, transversely disposed, radially projecting picker elements; said elements each comprising a soft rubber disc having outwardly presented arcuate lip portions adapted, in operation, to penetrate the feathers so as to engage the quills thereof at points close to the skin of the fowl, and, by movement against the quills, being effective to uproot the same out of the skin, thus casting off the feathers by an uprooting action upon the bases thereof, rather than by a pulling action frictionally exerted upon distal portions of the feathers by beaters, rubbers or like agencies heretofore commonly employed in mechanical pickers, and which are not only comparatively inefficient, but, by reason of the rather harsh beating and rubbing action thereof, will frequently tear the skin of the fowl and undesirably bruise the flesh thereof.

This invention has for another object to provide said soft rubber discs, which constitute the picker elements carried by the rotary picker drum, in a concavo-convex shape with their concave faces forwardly presented, whereby the lip portions thereof are of forwardly inclined tapered shape in cross-section, and consequently are not only well adapted to easily penetrate beneath the feathers so as to engage the quills thereof close to the skin of the fowl while at the same time disposing and supporting the distal portions of the feathers contiguous to the faces of the discs, but also being adapted to present only relatively thin and comparatively flexible portions of the discs in direct contact with the skin of the fowl, which portions are little likely to lacerate the skin or bruise the flesh of the fowl.

Other objects of this invention, not at this time more particularly enumerated, will be understood from the following detailed description of the same.

An illustrative embodiment of this invention is shown in the accompanying drawings, in which:

Fig. 1 is a side elevational view, and Fig. 2 is a front elevational view of poultry picking apparatus made according to this invention.

Fig. 3 is a transverse vertical sectional view through the picker drum of the apparatus, the section being taken on line 3—3 in Fig. 1, but drawn on an enlarged scale; Fig. 4 is a fragmentary sectional view, taken on line 4—4 in Fig. 3; and Fig. 5 is a further enlarged sectional view of a single picker element, illustrating its operative uprooting engagement with a feather preparatory to removal of the same from the body of the fowl under treatment.

Similar characters of reference are employed in the above described views, to indicate corresponding parts.

In the illustrative embodiment of this invention shown in said drawings, the reference character 10 indicates spaced side members of the framework of the apparatus. Said side members are provided with bearings 11, and journaled in and between said bearings 11 is the shaft 12 of the rotary picker drum of the apparatus.

The picker drum comprises a suitably formed cylindrical structure including circumferentially spaced supports by which the picker elements of the apparatus are carried, so as to distribute said elements in desired spaced relation over and about the operative circumferential area of the drum. In the illustrative form of drum structure shown, the same comprises a pair of drum end wheels 13 which are affixed to the shaft 12 in spaced apart relation. Affixed to and between the perimeters of said end wheels 13 by their base flanges 14 are a plurality of circumferentially spaced, bridging angle-iron bars, the upstanding flanges 15 of which project radially from the drum structure periphery formed thereby. Said base flanges 14 may be secured to the wheel perimeters by any suitable fastening means, but preferably the same are welded together, thus forming a unitary drum structure.

Each upstanding flange 15 carries, along its forward face, a row of spaced picker elements, and, preferably, the picker elements of one such row are disposed in staggered relation to those of adjacent rows. These picker elements comprise upstanding concavo-convex soft rubber discs 16, disposed in planes substantially parallel to the axis of the drum structure so as to lie substantially transverse to the direction of their movement, and with their concave faces forwardly presented in the direction of operative rotary motion of the drum structure. Said discs 16 are each provided with a central screw-threaded shank 17 rearwardly extending from the back thereof, which shanks 17 are passed through openings provided in the flanges 15 of the angle-iron bars, so as to seat the discs against the front faces of said flanges 15; the discs being thereupon secured in such assembled supported relation by fastening nuts and washers 18 applied to said shanks and screwed home against the back of said flanges 15, or said discs may be otherwise anchored in place in any other convenient manner.

Owing to their concavo-convex conformation, the front and rear faces of the discs 16 are convergingly related, whereby the peripheries of the discs are provided with lip portions 19 of tapered cross-sectional shape. The discs 16 are so positioned on the flanges 15 of the angle-iron bars that arcuate peripheral sections 20 thereof freely project beyond the free margins of said flanges 15, whereby such arcuate sections and the included tapered lip portions 19 thereof constitute the effective operative portions of the discs when the picker drum is in use.

Any suitable means may be provided for driving the picker drum from a suitable source of power. For example, as shown, an electric motor 21 may be provided as a power source, and suitably supported on a platform 22 carried by the frame-work of the apparatus. The drive pulley 23 on the motor armature shaft transmits, through the belt 24, driving power to the driven pulley 25 affixed to the picker drum shaft 12. The pulley ratio may be so selected as to revolve the picker drum at a desired peripheral speed.

Supported by brackets 26 extended from the side members 10 of the frame-work, is a suitably shaped hood member 27 disposed adjacent to the rear side of the drum, the same serving to receive and deflect the feathers, removed from fowl by and during operation of the picker drum, to a removable receptacle 28 which is supported by guide rails 29 and brackets 30 at the back of the apparatus and beneath the hood member 27.

In the use of the apparatus, the picker drum being rotated in clockwise direction, as viewed in Fig. 1, the operator grasps a fowl to be defeathered by the neck and feet, and applies the body surfaces thereof to the operative surface of the picker drum provided by the multiplicity of radially projecting free arcuate sections 20 of the picker discs 16, whereby the somewhat forwardly inclined or pitched tapered lip portions 19 thereof are caused to penetrate the feathers so as to enter beneath the same, and engage the quills $x$ thereof at points close to the skin surface $y$ of the body of the fowl, and so that the distal portions $z$ of the feathers are abutted and supported by the concave faces of said picker discs 16 (see Fig. 5).

Owing to the rapid forward movement of the picker discs 16, as thus engaged with the feathers, a strong uprooting pressure applied directly to the base of the feather quills occurs, and, consequently, the imbedded roots of the quills are quickly forced out and away from the flesh and skin of the fowl, whereby the feathers are cleanly withdrawn and separated from the fowl's body. The feathers thus dislodged, under centrifugal force set up by the whirling drum, are directed into the hood member 27, so as to be deflected thereby into the collecting receptacle 28.

The fowl is suitably manipulated by the operator so as to bring all the feathered surfaces of the body thereof into the described contact with the picker discs for operative engagement thereby, all of which can be accomplished with great rapidity and ease, with the result that a thorough and complete denuding of the fowl's body by the plucking away of both developed feathers and pin feathers occurs.

Owing to the circular shape of the picker discs 16 only the freely projecting arcuate peripheral sections 20 thereof can approach the skin of the fowl under treatment. Since these sections are angularly disposed relative to the skin surface, and since by reason of their arcuate peripheries only a limited extent of the somewhat yieldable margins of the tapered lip portions 19 bounding the same can contact the skin, the effect is to produce but a mild brushing contact with said skin which involves substantially no risk of lacerating the latter, and which also eliminates all beating or harsh rubbing action likely to either tear the skin or bruise the flesh of the fowl or both.

It will be understood that various changes could be made in the above described construction, and that widely different embodiments of this invention could be made without departing from the scope thereof as defined in the following claims. It is therefore intended that all matter contained in the foregoing description or shown in the accompanying drawings shall be interpreted as illustrative and not in a limiting sense.

I claim:

1. In apparatus for picking poultry, a movable means having an operative surface comprising a multiplicity of spaced upstanding soft rubber picker discs disposed in planes substantially transverse to the direction of motion thereof, and having freely projecting outer arcuate peripheral sections constituting their operative portions.

2. In apparatus for picking poultry, a movable means having an operative surface comprising a multiplicity of spaced upstanding soft rubber picker discs disposed in planes substantially transverse to the direction of motion thereof, said discs having freely projecting outer arcuate peripheral sections constituting their operative portions, said picker discs being arranged in transverse rows across said movable means, and with discs of one row arranged in staggered relation to those of adjacent rows.

3. In apparatus for picking poultry, a movable means having an operative surface comprising a multiplicity of spaced freely projecting circular soft rubber picker discs of concavo-convex conformation having tapered peripheral lip portions, said discs being disposed with their concave faces forwardly presented in planes substantially transverse to the direction of motion thereof.

4. In apparatus for picking poultry, a movable means having an operative surface comprising a multiplicity of spaced freely projecting circular soft rubber picker discs of concavo-convex conformation having tapered peripheral lip portions, said discs being disposed with their concave faces forwardly presented in planes substantially transverse to the direction of motion thereof, said picker discs being arranged in transverse rows across said movable means, and with discs of one row being arranged in staggered relation to those of adjacent rows.

5. In apparatus for picking poultry, a rotary drum having an operative surface comprising a multiplicity of spaced radially projecting circular soft rubber picker discs of concavo-convex conformation having tapered peripheral lip portions, said discs being disposed with their concave faces forwardly presented in planes substantially transverse to the direction of drum rotation.

6. In apparatus for picking poultry, a rotary drum having an operative surface comprising a multiplicity of spaced radially projecting circular soft rubber picker discs of concavo-convex conformation having tapered peripheral lip portions, said discs being disposed with their concave faces forwardly presented in planes substantially transverse to the direction of drum rotation, said picker discs being arranged in circumferentially spaced rows, and with the discs of one row disposed in staggered relation to those of adjacent rows.

7. In apparatus for picking poultry, a rotary drum having an operative surface comprising a multiplicity of spaced radially projecting circular soft rubber picker discs of concavo-convex conformation having tapered peripheral lip portions, said discs being disposed with their concave faces forwardly presented in planes substantially transverse to the direction of drum rotation, means for mounting said drum, and means for driving said drum.

8. In poultry picking apparatus, a rotary drum having radially projecting ribs disposed substantially parallel to its axis and circumferentially spaced around the periphery thereof, each rib having affixed thereto rows of circular soft rubber picker discs of concavo-convex conformation provided with tapered peripheral lip portions, said discs being disposed with their concave faces forwardly presented in planes substantially transverse to the direction of drum rotation, said discs having operative arcuate peripheral portions thereof freely projecting beyond the outer margins of said ribs.

9. In poultry picking apparatus, a rotary drum having radially projecting ribs disposed substantially parallel to its axis and circumferentially spaced around the periphery thereof, each rib having affixed thereto rows of circular soft rubber picker discs of concavo-convex conformation provided with tapered peripheral lip portions, said discs being disposed with their concave faces forwardly presented in planes substantially transverse to the direction of drum rotation, said discs having operative arcuate peripheral portions thereof freely projecting beyond the outer margins of said ribs, and discs of adjacent rows thereof being arranged in staggered relation.

10. In poultry picking apparatus, a rotary drum having radially projecting ribs disposed substantially parallel to its axis and circumferentially spaced around the periphery thereof, each rib having affixed thereto rows of circular soft rubber picker discs of concavo-convex conformation provided with tapered peripheral lip portions, said discs being disposed with their concave faces forwardly presented in planes substantially transverse to the direction of drum rotation, said discs having operative arcuate peripheral portions thereof freely projecting beyond the outer margins of said ribs, discs of adjacent rows thereof being arranged in staggered relation, a frame-work for mounting said drum, and means for driving said drum.

ROY H. SMITH.